(12) United States Patent
Oshima et al.

(10) Patent No.: US 7,295,547 B2
(45) Date of Patent: Nov. 13, 2007

(54) AUDIO GATEWAY DEVICE

(75) Inventors: Yoshinobu Oshima, Tokyo (JP); Satoru Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 1246 days.

(21) Appl. No.: 10/226,267

(22) Filed: Aug. 23, 2002

(65) Prior Publication Data

US 2003/0046387 A1 Mar. 6, 2003

(30) Foreign Application Priority Data

Sep. 4, 2001 (JP) ............................. 2001-267392

(51) Int. Cl.
*H04L 12/66* (2006.01)
*H04M 7/00* (2006.01)

(52) U.S. Cl. ...................... 370/352; 370/356; 370/401; 379/228

(58) Field of Classification Search ........ 370/352–356, 370/389, 401, 410, 493–494; 379/219, 228
See application file for complete search history.

(56) References Cited

U.S. PATENT DOCUMENTS 5,805,587 A * 9/1998 Norris et al. ................ 370/352
6,584,098 B1 * 6/2003 Dutnall ....................... 370/354
7,110,748 B2 * 9/2006 Murphy et al. ............. 370/352

FOREIGN PATENT DOCUMENTS

| CN | 1269940 A | 10/2000 |
|---|---|---|
| JP | 7-170288 | 7/1995 |
| JP | 2000-286897 | 10/2000 |
| WO | WO99/12329 | 3/1999 |

* cited by examiner

*Primary Examiner*—Suhan Ni
(74) *Attorney, Agent, or Firm*—Young & Thompson (57) ABSTRACT

A gateway device includes PDTN line terminating portion 1, audio data processing portion 2, header processing portion 3, packet network line terminating portion 4 and gateway control processor 5. Header processing portion 3 receives an RTP packet with session number from audio data processing portion 2 and outputs an IP packet attached with UDP/IP header information to packet network line terminating portion 4. Header processing portion 3 receives an IP packet from packet network line terminating portion 4 and checks UDP/IP header thereof When the IP packet is an audio packet, header processing portion 3 deletes the UDP/IP header, attaches a session number thereto and outputs an RTP packet with session number to audio data processing portion 2 and, when the IP packet is an audio packet, header processing portion 3 transfers it directly to audio data processing portion 2 to send the audio data to the PSTN through PSTN line terminating portion 1.

10 Claims, 6 Drawing Sheets

AUDIO GATEWAY DEVICE

BACKGROUND OF THE INVENTION

1. Field of the Invention

The present invention relates to a technique for transmitting audio data through a packet network and, in particular, an audio gateway device.

2. Description of the Related Art

The IP (Internet Protocol) telephone services (IP Telephony) for transmission of audio data through a packet network has been popular. Besides, the movement of reducing a working cost of the existing telephone network of line switching type by unifying telephone services thereof with packet services by constructing a backbone of telephone network with a packet network has become active year after year.

In the telephone service using a packet network, a gateway device for transferring existing telephone audio data through the packet network is necessary. In such gateway device, an audio processing and a session control (session ON/OFF control) are performed. An example of the conventional audio gateway device is VoIPMedia Gateway Module, a production of AudioCodes corporation.

Figure 6:
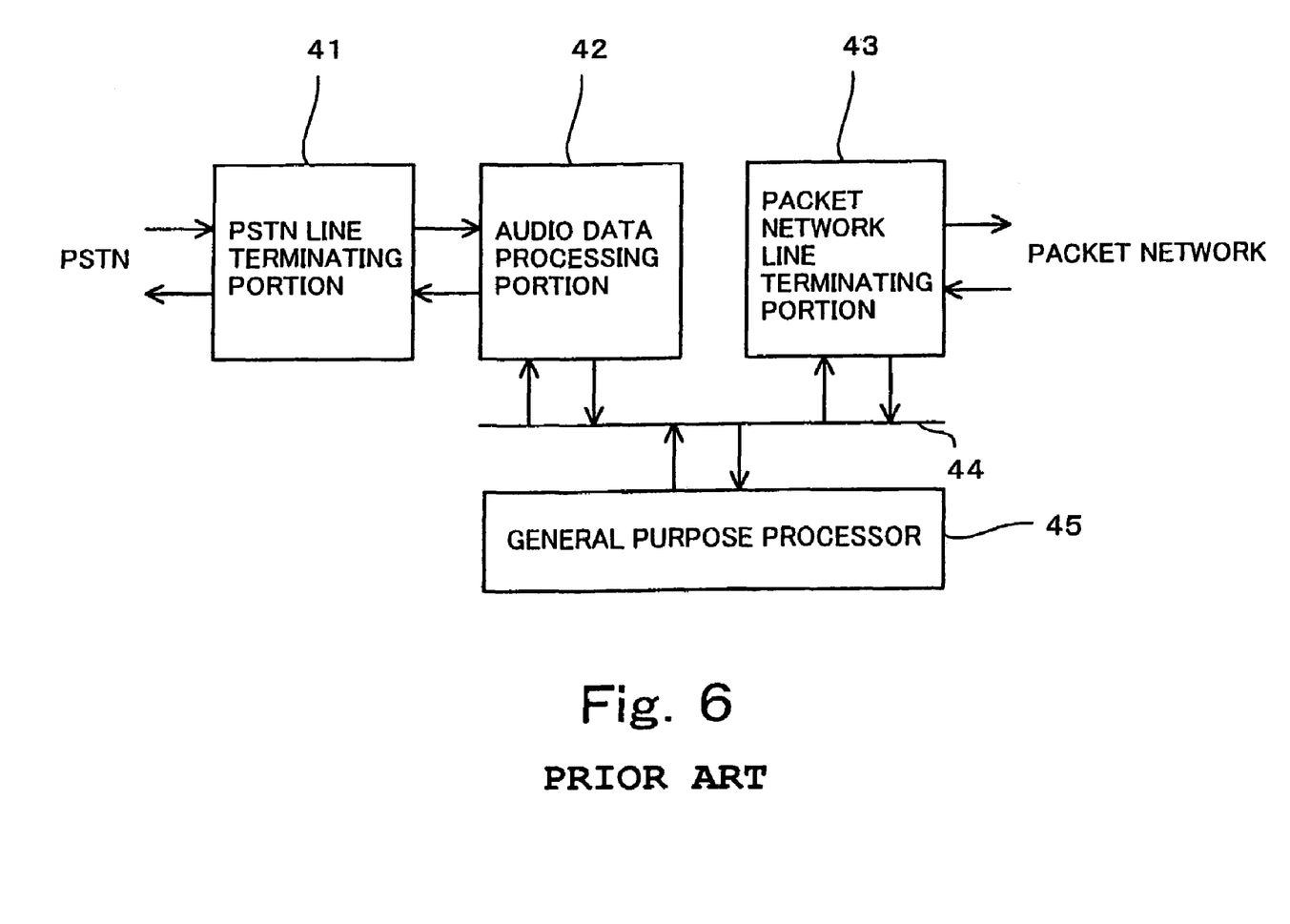
FIG. 6 shows a configuration of a conventional audio gateway device.

FIG. 6 is a block diagram showing a configuration of the conventional audio gateway device. As shown in FIG. 6, the audio gateway device includes PSTN (Public Switched Telephone Network) line terminating portion 41, audio data processing portion 42, packet network line terminating portion 43 and general purpose processor 45. In the conventional audio gateway device constructed as mentioned, UDP/IP (User Datagram Protocol/Internet Protocol) processing of all input packets is performed by processing the input packets by transferring them to general purpose processor 45 through processor bus 44 and performing the RTP (Real-Time Transport Protocol: RFC 1889. A standard for real-time transfer of various real-tie media of such as audio, video or other input data on an IP network) processing and the processing by a DSP (Digital Signal Processor) constituting audio data processing portion 42.

However, in a case where a gateway device capable of processing data of channels, for example, 700ch to 2000ch, is realized by using the above mentioned conventional audio gateway device in which all packets are temporarily processed by processor 45, a large amount of packets is processed by a software. Therefore, the processing performance of the gateway device is limited by the processing performance of the processor and the performance (data transfer speed, etc.) of processor bus 44. This is a practical problem.

Further, since the audio packet and the control packet are transmitted through same processor bus 44, there are other problems of delay of audio data and influence thereof on jitter.

SUMMARY OF THE INVENTION

An object of the present invention is to provide an audio gateway device capable of increasing a channel capacitance by improving a processing performance of a processor by means of reduction of a load on the processor for performing a gateway processing.

In order to achieve the above object, the audio gateway device for performing a mutual conversion between audio data of a telephone network and packet of a packet network, according to the present invention, includes means for analyzing a header information of a packet received from the packet network and, when the packet is an audio packet, transferring the audio packet directly to an audio data processing portion without transferring the audio packet to a processor for performing a control of a gateway control, to send the audio data from the audio data processing portion to a public switched telephone network through a line interface.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Preferred embodiments of the present invention will be described. In a preferable embodiment of the present invention, an audio gateway device comprises PSTN line terminating portion 1, audio data processing portion 2, header processing portion 3, packet network line terminating portion 4 and gateway control processor 5.

PSTN line terminating portion 1 includes means for terminating PSTN (Public Switched telephone Network) data and outputting an audio data to audio data processing portion 2 and means for processing the audio data outputted from audio data processing portion 2 according to a protocol of the PSTN and outputting a resultant PSTN data.

The audio data processing portion 2 includes means for transforming the audio data outputted from PSTN line terminating portion 1 into a packet and outputting a header of a real-time transfer protocol (RTP) for audio stream transfer and an RTP packet having a session number attached thereto to header processing portion 3.

Header processing portion 3 includes means for checking the session information of the RTP packet with session number outputted from audio data processing portion 2, deleting the session number and outputting the IP packet having UDP/IP header information attached thereto to packet network line terminating portion 4, means for checking the UDP/IP header of the IP packet outputted from packet network line terminating portion 4 and, when it is an audio packet, deleting the UDP/IP header, attaching a session number and outputting a RTP packet with the session number to audio data processing portion 2 and means for transferring, among IP packets outputted from packet network line terminating portion 4, a control data to be processed by gateway control processor 5 to gateway control processor 5.

Packet network line terminating portion 4 includes means for receiving the IP packet from header processing portion 3, processing it according to the protocol of the packet network and outputting packet data to the packet network and means for terminating the packet network, processing the inputted packet data according to the protocol and outputting the IP packet to the header processing portion.

Gateway control processor 5 includes means for receiving the control data from header processing portion 3, processing a state control of the gateway device and RTCP protocol, transferring the session information necessary for the header processing of the audio packet by header processing portion 3 to header processing portion 3 and receiving a statistical information of the RTP packet necessary in the RTCP protocol from audio data processing portion 2.

An gateway device used in a connecting portion between the PSTN line and a packet network line when a transmission network portion of PSTN in the existing telephone system is realized by a packet network such as Internet in a telephone system using a packet network and performing a mutual conversion between an audio data of PSTN and packet of the packet network, when a relay network portion of PSTN in an existing telephone service using the packet network is realizing by a packet network such as Internet, etc., which is applied to a connecting portion between the PSTN and a packet network and performing a mutual conversion between the PSTN audio data and the packet network packet includes a header processing portion for separating between the audio packet and the audio gateway control packet, the audio packet is directly transferred to the audio data processing portion without transferring to the processor portion, so that it is possible to reduce the load of the processor and to improve the processing performance of the device.

Figure 5:
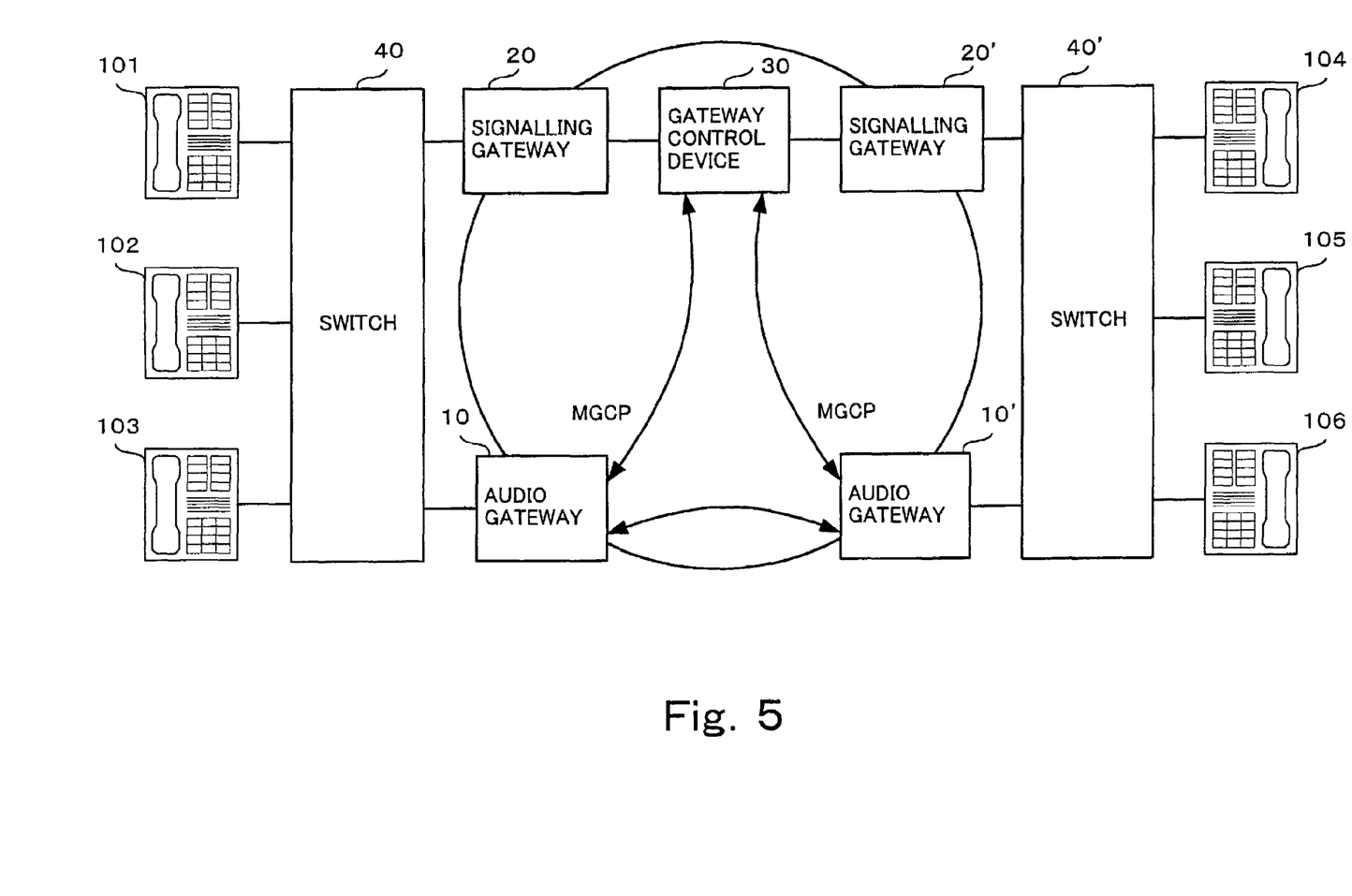
FIG. 5 shows a VoIP system configuration in which the audio gateway device is used.

The embodiments mentioned above will be described in more detail with reference to the accompanying drawings. FIG. 5 is a block diagram showing a configuration of the VoIP (Voice over IP) system having audio gateway devices according to a first embodiment of the present invention. In FIG. 5, telephone terminals 101 to 103 and telephone terminals 104 to 106 are connected to line switches 40 and 40', respectively. Audio gateway device 10 connected to switch 40 (or audio gateway device 10' connected to switch 40') performs a call setting according to a control data (such as MGCP: Media Gateway Control Protocol) of gateway control device 30, converts audio data from switch 40' (or switch 40) into a packet and outputs the packet to switch 40' (or 40). One of audio gateway devices 10 and 10' processes the audio packet from the other audio gateway device to obtain an audio data and outputs the audio data to corresponding switch 40 or 40'. Signaling gateways 20 and 20' perform a processing of SS7 (Signaling System No. 7).

Figure 1:
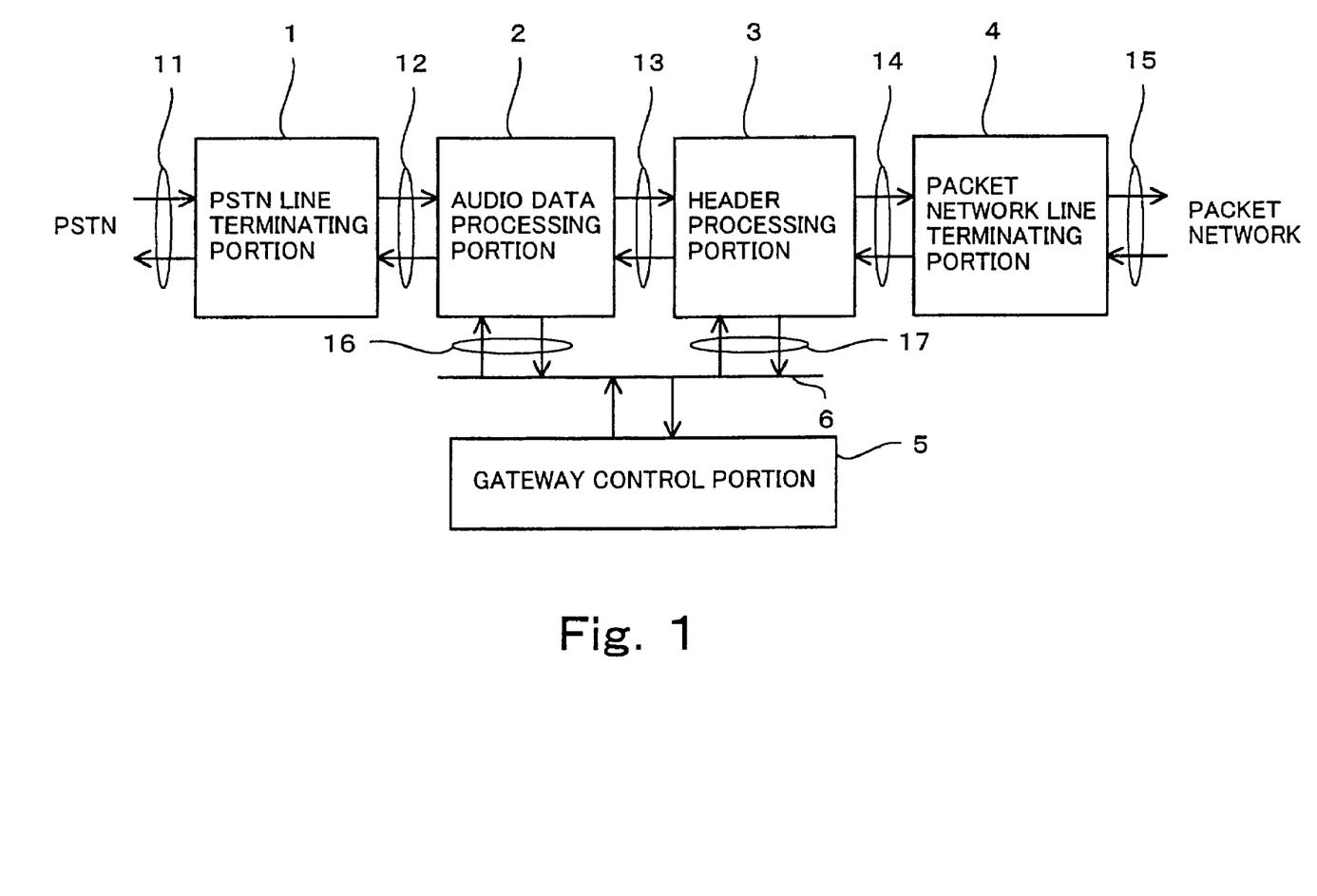
FIG. 1 shows a configuration of an audio gateway device according to a first embodiment of the present invention.

FIG. 1 shows a configuration of an audio gateway device according to an embodiment of the present invention. The audio gateway device shown in FIG. 1 includes PSTN line terminating portion 1, audio data processing portion 2, header processing portion 3, packet network line terminating portion 4 and gateway control portion 5.

PSTN line terminating portion 1 terminates PDTN data 11 and outputs 125 μm period 8-bit=64 kbps TDM (Time Division Multiplex) audio data 12. PSTN line terminating portion 1 receives TDM audio data 12, processes it according to the protocol of the PSTN and outputs PSTN data 11.

Audio data processing portion 2 receives TDM audio data 12 outputted from PSTN line terminating portion 1, converts it into a packet and outputs RTP (Real-Time Transport Protocol) packet 13 having a RTP header and session number attached thereto. The RTP header is a header of a RTP packet for transmitting a compressed signal and contains a PT (Payload Type) indicative of a compression coding system of a media to be transmitted, a sequence number attached to each packet, a time stamp information, an SSRC (Synchronization Source) identifier and CSRC (Contributing Source) identifier, as well known.

Audio data processing portion 2 converts RTP packet 13 having the session number outputted from header processing portion 3 into TDM audio data 12 and outputs it.

Audio data processing portion 2 has functions of echo cancellation, tone detection/production, VAD (Voice Active Detection) for reducing the number of bits in 1 frame in silent portion by detecting voice, voice compression/expansion and jitter buffering, which are performed according to an instruction from gateway control processor 5. Further, audio data processing portion 2 has a function of collecting statistic information of audio packet and notifies gateway control processor 5 of statistical information 16 according to an instruction from gateway control processor 5.

Header processing portion 3 receives RTP packet 13 with session number outputted from audio data processing portion 2, checks the session information, deleting the session number, attaches UDP/IP header information thereto and outputs IP packet 14. The RTP packet is transferred by using UDP/IP.

Header processing portion 3 receives IP packet 14 sent from packet network line terminating portion 4 and checks on the UDP/IP header thereof. When IP packet 14 is an audio packet, header processing portion 3 deletes the UDP/IP header, attaches a session number thereto and outputs RTP packet 13 with session number.

Header processing portion 3 receives a gateway control protocol outputted from gateway control processor 5 and control IP packets such as RTCP (RT Control Protocol, a protocol for assisting RTP) packet, puts it on control data 17 from gateway control processor 5 and outputs it to packet network line terminating portion 4 as IP packet 14.

Header processing portion 3 separates, from IP packet 14 outputted from packet network line terminating portion 4, control data 17 to be processed by gateway control processor 5 and drops or transfers it to gateway control processor 5 through processor bus 6.

Further, header processing portion 3 acquires an information of every session, which is necessary for the header processing, from control data 17 from gateway control processor 5.

Packet network line terminating portion 4 receives IP packet 14 from header processing portion 3, processes it according to the packet network protocol and outputs packet data 15 to the packet network.

Packet network line terminating portion 4 terminates the packet network, performs the protocol processing of inputted packet data 15 and outputs IP packet 14.

Gateway control processor 5 receives control data 17 such as MGCP (Media Gateway Control Protocol), which is sent from the gateway control device to control the audio gateway device, and performs a session ON/OFF control and RTCP processing. The RTCP packet contains various packets of such as notice (SR) from a transmission terminal, notice (RR) from a receiving terminal, description (SDES) related to information sources, communication dropout (BYE) and application inherent information (APP), etc., transmitted by using UDP/IP and solves problems such as flow control, which is not provided in RTP, clock synchronization, comparison of reproduction timing between media and correspondence of information sources, etc., by mutual notice of control information between a transmitter and a receiver.

Gateway control processor 5 acquires statistical information 16 of every session, which is necessary for the RTCP processing, by making a request to audio data processing portion 2 for statistical information 16.

Gateway control processor 5 transfers the session information (header information of UDP/IP, etc.), which is necessary for the header processing of the audio packet in header processing portion 3, to header processing portion 3 through control data 17.

Figure 2:
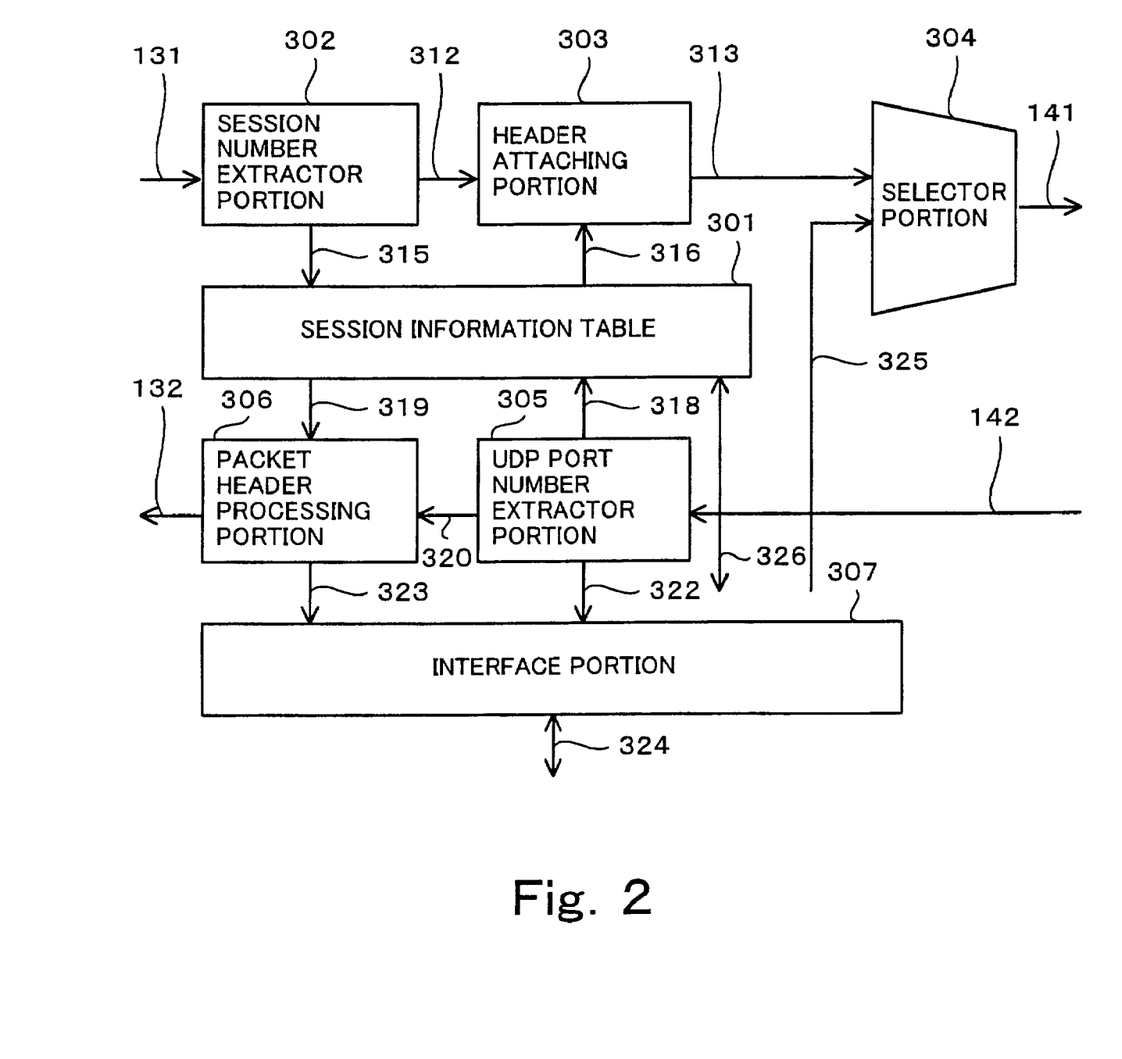
FIG. 2 shows a configuration of a header processing portion of the audio gateway device shown in FIG. 1.

FIG. 2 is a block diagram showing an example of the configuration of header processing portion 3 according to an embodiment of the present invention. Header processing portion 3 includes session information table 301, session number extracting portion 302, header attaching portion 303, selector portion 304, UDP port number extracting portion 305, packet header processing 306 and interface portion 307.

Session number extractor portion 302 extracts, from RTP packet 131 having the session number and outputted from audio data processing portion 2, session number information 315 and outputs it to session information table portion 301. Further, session number extractor portion 302 outputs RTP packet 312 whose session number information is deleted to header attaching portion 303.

Session information table 301 receives session number 315 from session number extractor portion 302, searches UDP/IP header information according to session number 315 and outputs UDP/IP header information 316 obtained by the search.

Header attaching portion 303 attaches UDP/IP header information 316 outputted from session information table 301 to RTP packet 312 and outputs resultant IP packet 313.

UDP port number extractor portion 305 checks IP packet 142 from packet network line terminating portion 4 and, when it contains no UDP header, outputs drop IP packet 322 to gateway control processor portion 5 shown in FIG. 1 in order to drop or transfer.

When IP packet 142 contains a UDP header, UDP port number extractor portion 305 extracts destination port number information 318 of the UD header and outputs destination port number information 318 to session information table 301 and IP packet 320 to packet header processing portion 306.

Session information table 301 outputs session number and valid flag information 319 according to UDP destination port number information 318.

When it is decided from session number and session valid flag information 319 that IP packet 320 is a packet of a valid session, packet header processing portion 306 makes the IP packet as a RTP packet by deleting the UDP/IP header thereof, attaches a session number and outputs RTP packet 132 having session number attached thereto.

When IP packet 320 is a packet of an invalid session, that is, it is not an audio packet but a control information packet, etc., packet header processing portion 306 outputs drop IP packet 323 for dropping the IP packet to gateway control processor 5 shown in FIG. 1.

Interface portion 307 functions as an interface between header processing portion 3 and gateway control processor 5 shown in FIG. 1 and outputs drop IP packets 322 and 323 dropped in packet header processing portion 306 and UDP port number extractor portion 306 to gateway control processor 5 as control data 324.

Further, interface portion 307 inputs the IP packet from gateway control processor 5 as control data 324 and outputs IP packet 325.

Further, in order to update the session information of session information table 301, interface portion 307 receives control data 324 from session information table 301 and supplies session information 326 to session information table 301.

Selector portion 304 selectively receives one of IP packet 313 from header attaching portion 303 and IP packet 325 from interface portion 307 and outputs IP packet 141.

Figure 3:
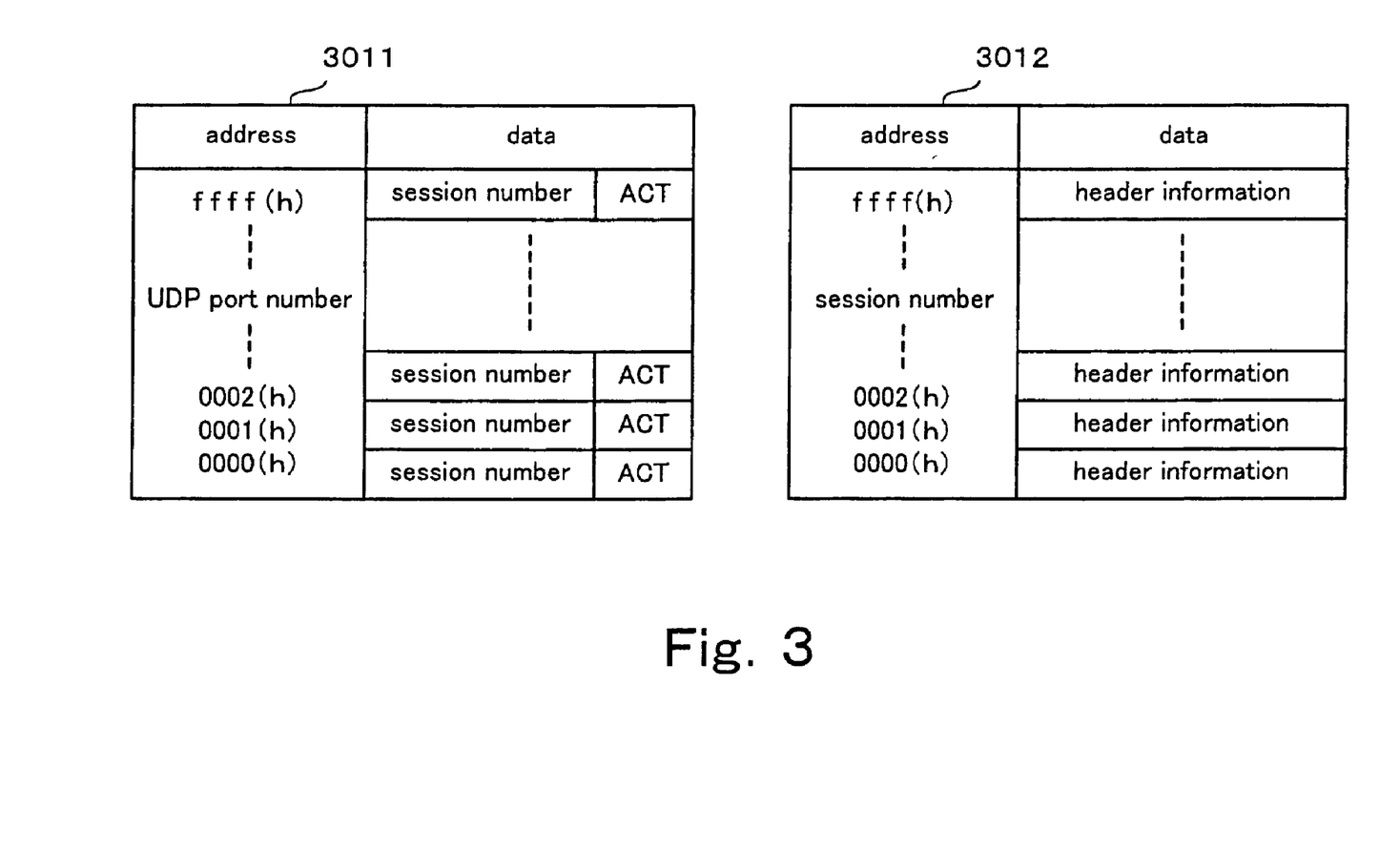
FIG. 3 shows a configuration of a session information table in the audio gateway device shown in FIG. 1.

FIG. 3 shows an example of session information table 301 shown in FIG. 2. As shown in FIG. 3, session information table 301 includes session number search memory 3011 and header information search memory 3012. Session number search memory 3011 stores session numbers and session valid flag (ACT) as data with using the UDP port numbers as addresses. Header information search memory 3012 stores UDP/IP header information as data with using the session numbers as addresses.

An operation of the audio gateway device according to the embodiment of the present invention. In the audio gateway device, audio packet and control packet are mainly handled. In this description, an audio packet having the payload (audio data)/RTP/UDP/IP configuration will be described. When the audio packet is identified, the gateway device of this embodiment directly transfers the audio packet to audio data processing portion 2 without transferring it to gateway control processor 5.

In order to clear session information table 301 at initialization, all session valid flags (ACT) in session number search memory 3011 are set as invalid.

At a start of session, gateway control processor 5 sets a session valid flag (ACT) with respect to the UDP destination port number in session number search memory 3011 as a session information and stores the session number.

Gateway control processor 5 sets the UDP/IP header information corresponding to the session number in header information search memory 3012.

At an end of the session, gateway control processor 5 invalidates the session valid flag (ACT) corresponding to the UDP destination port number in session number search memory 3011.

Returning to FIG. 1, packet network line terminating portion 4, which receives an audio packet transferred from the packet network, outputs IP packet 14 to header processing portion 3.

In FIG. 2, UDP port extractor portion 305 of header processing portion 3 receives IP packet 142 from packet network line terminating portion 4 and checks the IP header information. When it is decided that the IP packet is a packet containing a UDP header, UDP port extractor portion 305 extracts the UDP destination port number and sends it to session information table 301.

Upon the reception of the UDP destination port number from UDP port extractor portion 305, session information table 301 searches session number search memory 3011 with using the port number as an address value, reads the session number and valid flag data from session number search memory 3011 and outputs session number and valid flag 319 to packet header processing portion 306.

Packet header processing portion 306 receives session number and valid flag data 319 from session information table 301 and the packet from UDP port number extractor portion 305, deletes the UDP/IP header, attaches the session number supplied from session information table 301 to the RTP packet and transfers the latter to audio data processing portion 2 (FIG. 1).

In FIG. 1, audio data processing portion 2 converts the audio packet of the RTP packet into TDM audio data 12 and PSTN line terminating portion 1 puts it on a network frame and outputs PSTN data 11.

PSTN data 11 supplied to PSTN line terminating portion 1 is converted into TDM audio data 12 in PSTN line terminating portion 1 and audio data processing portion 2 converts it into a RTP packet, attaches a session information thereto and outputs it to header processing portion 3.

In FIG. 2, session number extractor portion 302 of header processing portion 3 sends the session number to session information table 301.

Session information table 301 receives the session number from session number extractor portion 302, reads the UDP/IP header information from header information search table 3012 with using the same session number as an address and outputs the UDP/IP header information to header attaching portion 303.

Header attaching portion 303 receives the UDP/IP header information from session information table 301, attaches the UDP/IP header to the RTP packet to produce packet 313 and supplies packet 313 to selector portion 304. Packet 313 is supplied through selector portion 304 to packet network line terminating portion 4 (FIG. 1). In packet network line terminating portion 4, packet 313 is processed according to the protocol of the packet network and sent to the packet network.

Now, the processing of the control packet data such as MGCP or RTCP, etc., will be described.

In FIG. 1, the control packet from the packet network is converted into the IP packet by packet network line terminating portion 4 and the IP packet is transferred to header processing portion 3.

In FIG. 2, UDP port extractor portion 305 of header processing portion 3 decides whether or not the IP packet is a packet containing UDP on the basis of the IP header information. When the IP packet contains no UDP header (it contains, for example, a TCP header), UDP port extractor portion 305 drops the IP packet to gateway control processor 5.

On the other hand, when it contains a UDP header, UDP port extractor portion 305 extracts the UDP destination port number similarly to the audio packet, searches session information table 301 and outputs a result of search to packet header processing portion 306.

Packet header processing portion 306 receives session number and valid flag 319 from session information table 301, decides that it is not an audio packet since there is no valid flag (ACT) of port number other than the port number of the audio data and drops the same packet in gateway control processor 5 (FIG. 1).

In FIG. 1, the control IP packet produced by gateway control processor 5 is sent to header processing portion 3 as control data 17. Control data 17 is outputted to packet network line terminating portion 4 through selector portion 304 (FIG. 2) of header processing portion 3, processed according to the packet network protocol and outputted to the packet network.

In this manner, the audio packet is directly transferred to audio data processing portion 2 without passing through gateway control processor 5, so that it is possible to reduce the load of the gateway control processor to thereby improve the processing capability of the gateway device, that is, to increase the channel capacity.

Figure 4:
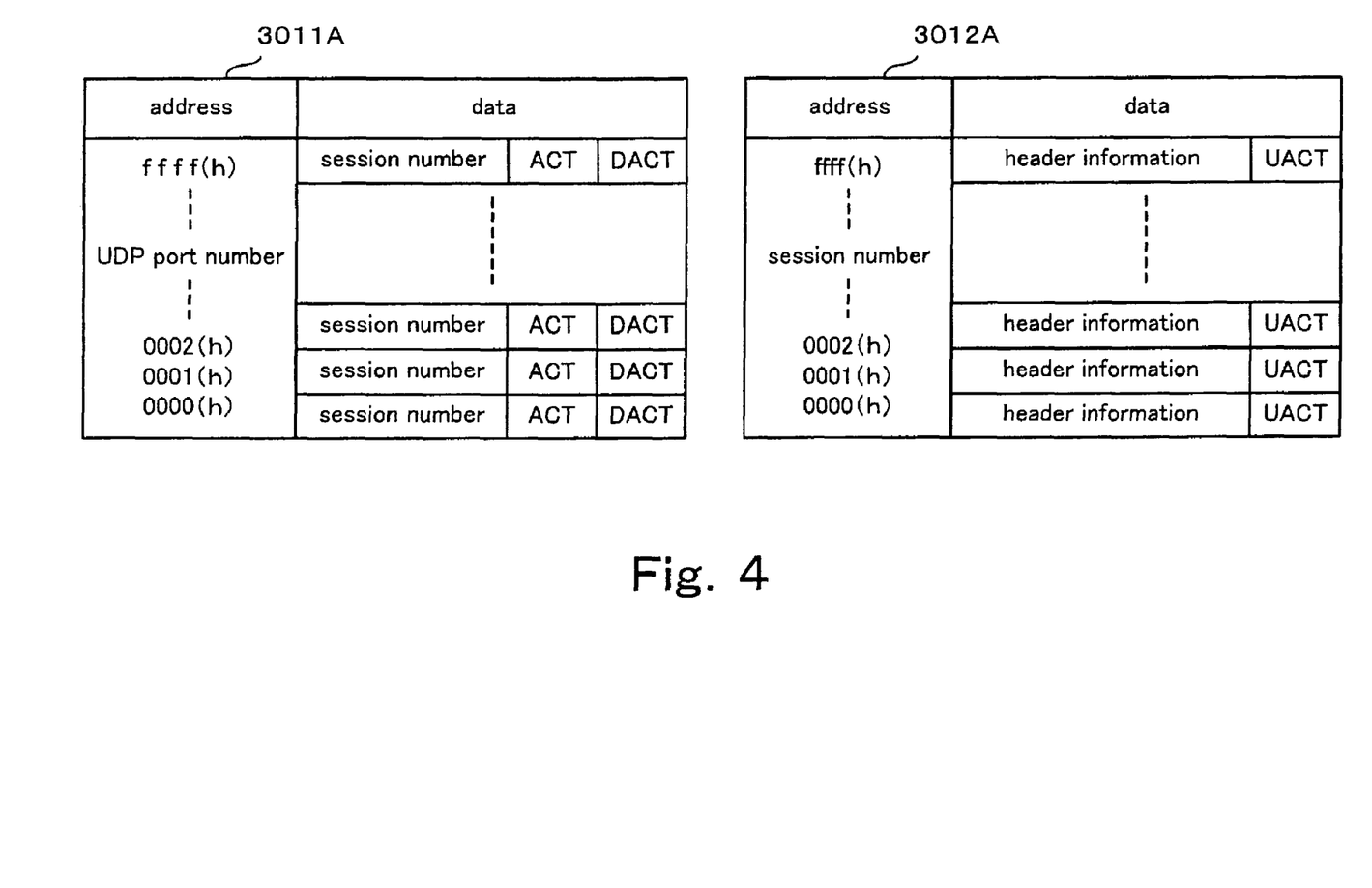
FIG. 4 shows a configuration of a session information table in the audio gateway device according to another embodiment of the present invention.

Now, a second embodiment of the present invention will be described. A basic configuration of the second embodiment is similar to that of the first embodiment, which was described with reference to FIG. 1 and FIG. 2, except the configuration of session information table 301. FIG. 4 shows the configuration of the session information table, according to the second embodiment of the present invention.

Referring to FIG. 4, flag bit (DACT) indicative of whether or not RTP packet 13 having session information of a session is to be outputted to audio data processing portion 2 is added to session number search memory 3011A of session information table 301. Further, flag bit (UACT) indicative of whether or not IP packet 14 of audio data is to be outputted to packet network line terminating portion 4 is added to header information search memory 3012A.

In the processing of the PSTN side audio data from on the packet network by header processing portion 3 (FIG. 2) of the second embodiment of the present invention, packet header processing portion 306 confirms the flag bit DACT of session number search memory 3011A. When the packet output to audio data processing portion 2 is good (G), the packet is outputted to audio data processing portion 2 and, when it is not good (NG), the packet is dropped.

Similarly, in the processing of the packet side audio data on the side of the PSTN, header attaching portion 303 confirms the flag bit UACT of header information search memory 3012A. When the packet output to network line terminating portion 4 is good (G), the packet is outputted thereto and, when it is not good (NG), the packet is dropped.

As described, in the second embodiment of the present invention, the transmission setting of a session set by the flag bit UACT of header information search memory 3012A and the flag bit DACT of session number search memory 3011A is controlled every session and every transmission direction. Therefore, it becomes possible to correspond to a control (send only, receive only or send and receive) in every direction instructed by the session control such as MGCP.

Although the present invention has been described in detail with respect to the embodiments, the present invention is not limited thereto and it is clear that the embodiments can be variously changed or modified within the scope of the present invention, which is defined by the appended claims, by those skilled in the art.

As described, according to the present invention, the transfer of audio packet and the UDP/IP header processing are performed by the hardware by constructing the system such that the audio packet is directly transferred to the audio data processing portion without through the gateway control processor. Therefore, the load of the gateway control processor can be reduced and hence the processing performance of the gateway control processor can be improved. Due to the improvement of the gateway control processor, it becomes possible to increase the cannel capacity.

In addition, according to the present invention in which the audio packet data is transferred by the hardware control, it is possible to substantially reduce the transfer delay compared with the software processing by the gateway control processor.

What is claimed is:

1. An audio gateway comprising a public switched telephone network terminating portion, an audio data processing portion, a header processing portion, a packet network line terminating portion and a gateway control processor, wherein said public switched telephone network line terminating portion comprises:

means for terminating a public switched telephone network data and outputting audio data to said audio data processing portion; and means for processing the audio data outputted from said audio data processing portion according to a protocol of said public switched telephone network to obtain a public switched telephone network data and outputting the public switched telephone network data, said audio data processing portion comprises:

means for converting the audio data outputted from said public switched telephone network line terminating portion into a packet and outputting an RTP packet having a header of a real-time transfer protocol for transferring an audio stream and a session number attached thereto to said header processing portion; and means for converting the RTP packet outputted from said header processing portion and having the header and the session number into audio data and outputting the audio data to said public switched telephone network line terminating portion, said header processing portion comprises:

means for checking the session information of the RTP packet outputted from said audio data processing portion and having the session number, removing the session information and outputting an IP packet having a UDP/IP header information to said packet network line terminating portion;

means for checking the UDP/IP header of the IP packet outputted from said packet network line terminating portion, removing the UDP/IP header of the IP packet when the IP packet is an RTP packet audio packet, attaching the session number to the IP packet to obtain an RTP packet with the session number to said audio data processing portion; and means for transferring a control data of the IP packet outputted from said packet network line terminating portion and to be processed by said gateway control processor to said gateway control processor, said packet network line terminating portion comprises:

means for processing the IP packet from said header processing portion according to the protocol of the packet network and outputting a packet data to said packet network; and means for terminating said packet network, processing an input packet data according to the protocol of said packet network and outputting the IP packet to said header processing portion, said gateway control processor comprises:

means for transferring a session information necessary in the header processing of the audio packet in said header processing portion to said header processing portion.

2. An audio gateway as claimed in claim 1, wherein said header processing portion comprises means for attaching a gateway control protocol outputted from said gateway control processor and/or a control packet of a real-time transport control protocol (RTCP) packet to the control data from said gateway control processor and outputting the control data attached with the gateway control protocol and/or the control packet to said packet network line terminating portion as the IP packet.

3. An audio gateway as claimed in claim 1, wherein said header processing portion receives the IP packets outputted from said packet network line terminating portion, detecting packets among the IP packets, which are to be processed by said gateway control processor and transferring the control data to said gateway control processor through a processor bus.

4. An audio gateway as claimed in claim 1, wherein said header processing portion additionally acquires an information in every session, which is necessary in header processing, from the control data transferred from said gateway control processor through said processor bus.

5. An audio gateway as claimed in claim 1, wherein said gateway control processor receives a control data for controlling a gateway control device controlling said audio gateway or an audio gateway and performs an ON/OFF control of session and the real-time transport control protocol processing.

6. An audio gateway as claimed in claim 1, wherein said gateway control processor requests and acquires a statistical information of every session, which is necessary in the processing of the real-time transport control protocol, from said audio data processing portion.

7. An audio gateway as claimed in claim 1, wherein said gateway control processor transfers the session information, which is necessary for said header processing portion in processing the header of the audio packet, to said header processing portion through the control data.

8. An audio gateway as claimed in claim 1, wherein said audio data processing portion has functions of echo canceller, tone detector/generator, VAD (Voice Active Detection), audio compression/expansion and jitter buffer and additionally a function of collecting the statistical information of audio packet and notifies said gateway control processor of the statistical information according to an instruction of said gateway control processor.

9. An audio gateway as claimed in claim 1, wherein said header processing portion comprises a session information table, a session number extracting portion, a header attaching portion, a selector portion, a UDP port number extracting portion, a packet header processing portion and an interface portion, wherein said session number extracting portion comprises means for extracting a session number information of the RTP packet outputted by said audio data processing portion, outputting the session number information to said session information table portion and outputting the RTP packet having no session number information to said header attaching portion, said session information table comprises means for searching an UDP/IP header information by searching a header information search memory storing session numbers and header information corresponding to the session numbers for the session number outputted from said session number extracting portion and outputting the UDP/IP header information, said header attaching portion comprises means for receiving the UDP/IP header information outputted from said session information table and outputting an IP packet attached to the RTP packet to said selector portion, said UDP port number extracting portion comprises means for checking an IP packet inputted from said packet network line terminating portion and outputting a drop IP packet to be transferred to said gateway control processor when the IP packet contains no UDP header and means for extracting a destination port number information of the UDP header and outputting the extracted destination port number information to said session information table and the IP packet to said packet header processing portion, when the inputted IP packet contains the UDP header, said session information table further comprises means for receiving the UDP destination port number information sent from said UDP port number extracting portion and outputting a session number and a valid flag information by searching a session number search memory storing port numbers, session numbers and valid flags, said packet header processing portion comprises means for making a IP packet as the RTP packet by removing the UDP/IP header thereof when an IP packet is decided from the session number and a valid flag information of session outputted from said session information table that the IP packet is a packet of a valid session and outputting the RTP packet by attaching a session number to the RTP packet and for outputting the drop IP packet to be transferred to said gateway control processor when the IP packet is a packet of an invalid session, said interface portion comprises means for outputting the drop IP packet from said packet header processing portion and said UDP port number extracting portion to said gateway control processor as a control data, means for receiving the IP packet outputted from said gateway control processor as a control data and outputting the control data to said selector portion as an IP packet and means for receiving a control data from said gateway control processor and supplying the session information to said session information table, in order to update the session information of said session information table, said selector portion selects the IP packet outputted from said header attaching portion and the IP packet outputted from said interface portion and outputting them to said packet network line terminating portion.

10. An audio gateway as claimed in claim 9, wherein, said session number search memory contains a flag information (DACT) indicative of whether or not the RTP packet having the session information is outputted to said audio data processing portion, and said header information search memory contains a flag information (UACT) indicative of whether or not an IP packet of an audio data to said packet network line terminating portion, in a processing of an audio data on a PDTN side from said packet network, said packet header processing portion confirms the flag information (DACT) of said session number search memory and outputs the packet to said audio data processing portion when it is possible to output the packet to said audio data processing portion and abandons the packet when it is impossible to output the packet to said audio data processing portion, and in the processing of the audio data on the packet side from PSTN, said header attaching portion confirms the flag information (UACT) of said header information search memory and outputs the flag information to said packet network line terminating portion when it is possible to output the packet to said packet network line terminating portion and abandons the packet when it is impossible to output the packet to said packet network line terminating portion.

* * * * *